Oct. 27, 1964  E. S. KRESS  3,154,322
WHEEL SUSPENSION SYSTEM FOR VEHICLES
Filed March 27, 1961  6 Sheets-Sheet 1

INVENTOR:
EDWARD S. KRESS
BY
John F. Schmidt

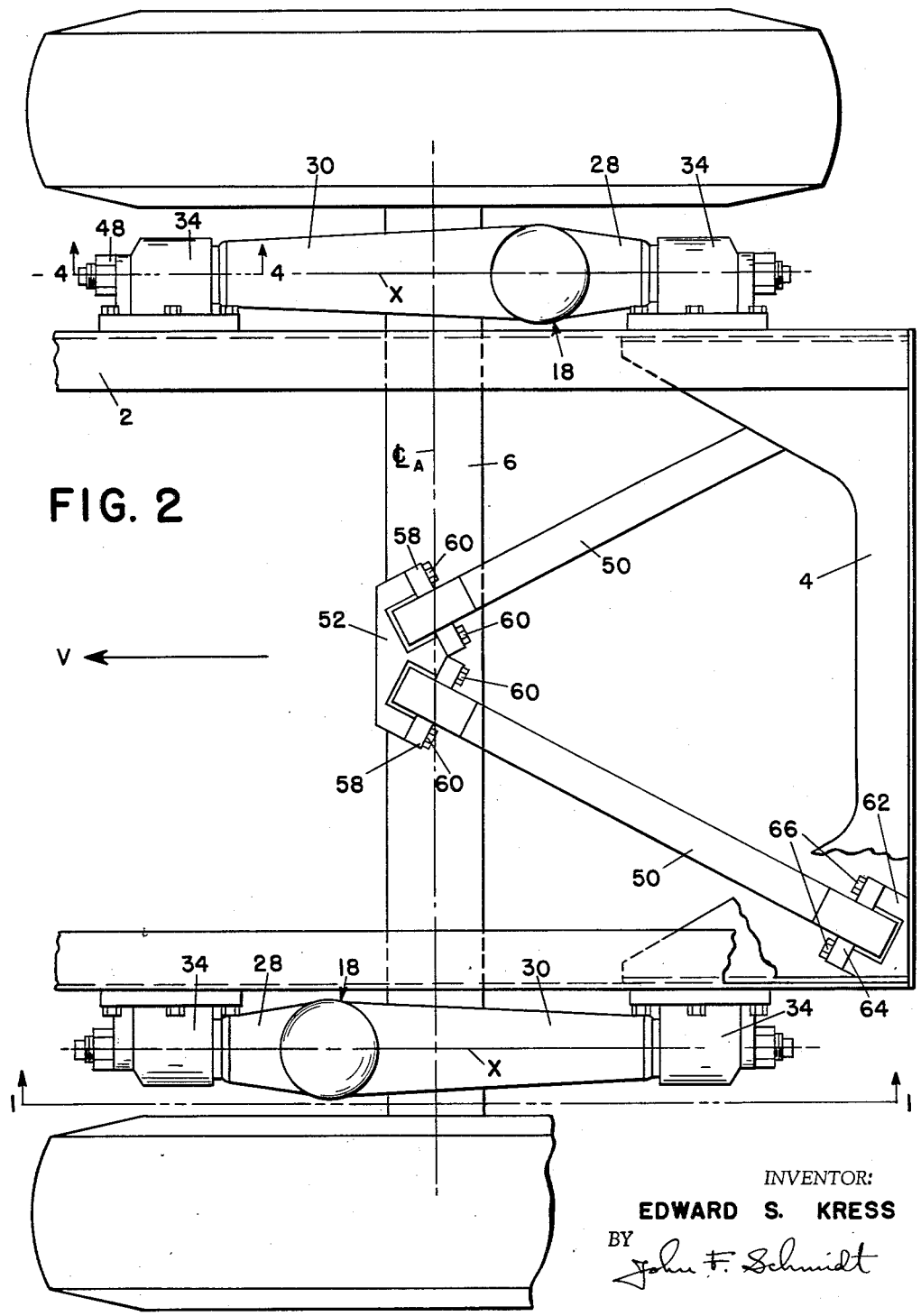

Oct. 27, 1964   E. S. KRESS   3,154,322
WHEEL SUSPENSION SYSTEM FOR VEHICLES
Filed March 27, 1961   6 Sheets-Sheet 3
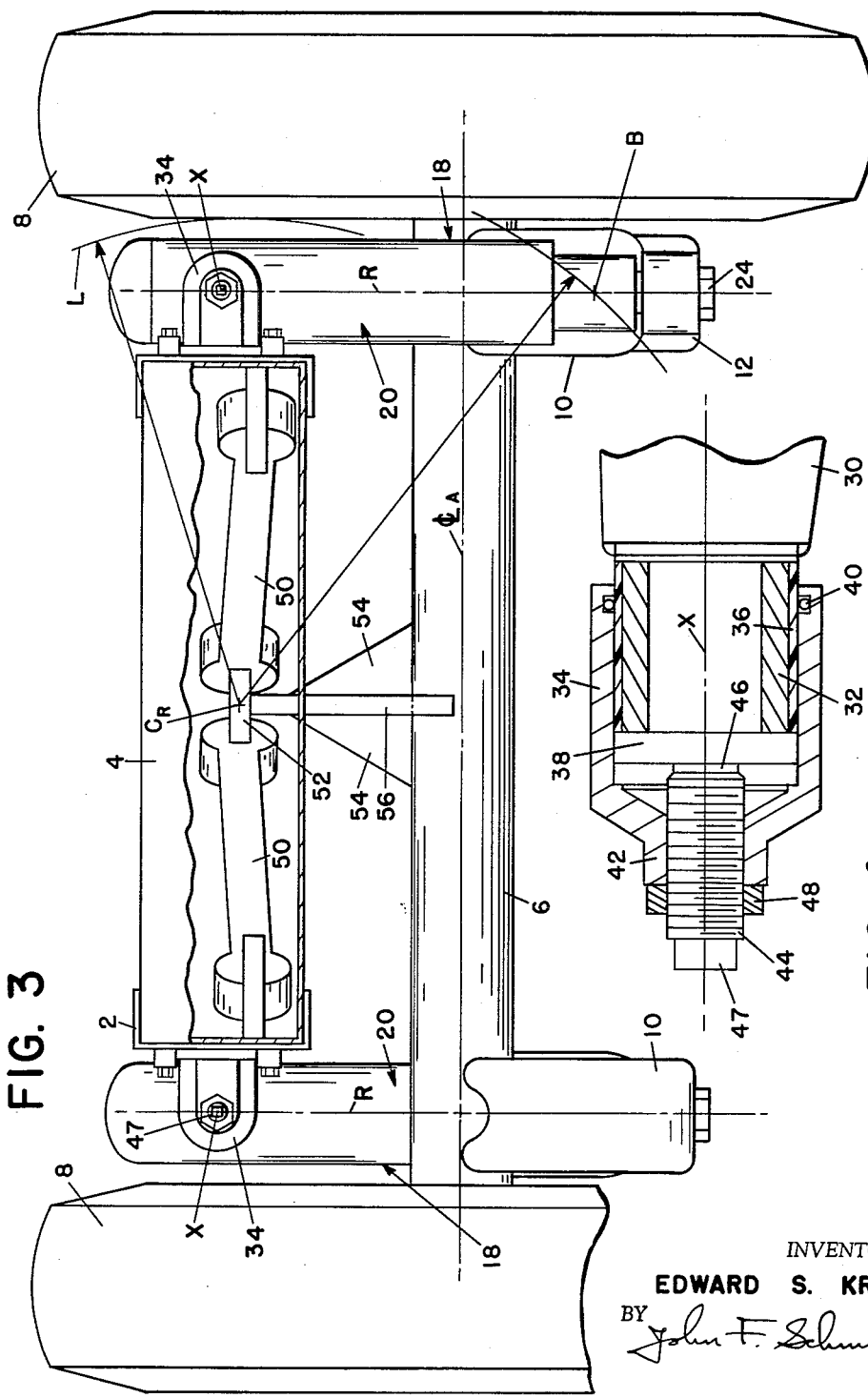
INVENTOR:
EDWARD S. KRESS
BY John F. Schmidt Oct. 27, 1964  E. S. KRESS  3,154,322
WHEEL SUSPENSION SYSTEM FOR VEHICLES
Filed March 27, 1961  6 Sheets-Sheet 4

INVENTOR:
EDWARD S. KRESS
BY John F. Schmidt

Oct. 27, 1964  E. S. KRESS  3,154,322
WHEEL SUSPENSION SYSTEM FOR VEHICLES
Filed March 27, 1961  6 Sheets-Sheet 5

INVENTOR:
EDWARD S. KRESS
BY John F. Schmidt

Oct. 27, 1964 E. S. KRESS 3,154,322
WHEEL SUSPENSION SYSTEM FOR VEHICLES
Filed March 27, 1961 6 Sheets-Sheet 6

INVENTOR:
EDWARD S. KRESS
BY John F. Schmidt

United States Patent Office 3,154,322
Patented Oct. 27, 1964

3,154,322
WHEEL SUSPENSION SYSTEM FOR VEHICLES
Edward S. Kress, Peoria, Ill., assignor to Kress Automotive Engineering, Peoria, Ill., a partnership
Filed Mar. 27, 1961, Ser. No. 98,495
22 Claims. (Cl. 280—124)

This invention relates to vehicles, and especially to a suspension system for vehicles.

Wheeled vehicles have developed for years about suspension systems utilizing steel springs. A study of vehicle design would appear to indicate a wide-spread assumption by designers that only stressed metal could be relied on to absorb the shocks of road irregularities while carrying whatever load the vehicle was designed for. While metal springs generally served the purpose, they always brought with them a number of problems which in turn saw the development of numerous solutions or attempts at solutions.

One problem inherent in metal springs is impact and rebound shock, and so-called "shock absorbers" have been developed to bring such shock under sufficient control to make suspension systems tolerable under the varying road conditions that vehicles are likely to encounter. In the circumstances, shock absorbers for metal suspension devices are "extras"—i.e., auxiliaries which must be added to an already cumbersome design.

Another problem inherent in metal spring suspensions is the very large bulk and weight involved in such suspensions as the loads they must carry keep increasing in size. What has happened is that, in large and heavily loaded vehicles, any metal spring that is resilient enough to give satisfactory "ride" characteristics turns out to be so large and so heavy that such a spring becomes ridiculous; the end result is a metal spring of manageable physical proportions, but which because of the large load must be so stiff as to be a "spring" in name only.

One very practical solution to the problem involves a complete departure from tradition, in which the concept of elastic deformation of metal is abandoned in favor of a device that utilizes the characteristics of fluids, liquid and gaseous, to provide the resilience desired and at the same time provide integral means to control shock, initial or impact shock, and rebound shock. Examples of such devices are given in Patents 2,914,337 and 2,914,338 to R. H. Kress, issued November 24, 1959.

In the two Kress patents identified, the suspension device and the axis of rotation of its associated wheel lie in substantially the same plane. Such a design is not always feasible for space reasons, and where the load and the reaction force lie in spaced planes, a couple exists which must be balanced by an equal and opposite couple in order to keep the system in equilibrium.

In connection with space limitations, discussed above, it should also be pointed out that the two Kress patents referred to were not seriously affected by such limitations because the vehicles embodying the invention of Patent 2,914,337 were designed around the suspension device, whereas the invention here disclosed and claimed results from a situation in which a suspension device had to be designed for an existing (already in production) vehicle for which the chassis design was already determined.

It is accordingly an object of this invention to provide an oleopneumatic suspension device which avoids the disadvantages of metal springs in providing a soft ride with a minimum of apparatus weight and bulk, and which provides integral control of the motion due to impact and the motion on rebound. It is moreover an object of this invention to provide suspension means of the type indicated which can be applied to a vehicle in which the design of other components is already determined. It is also an object of this invention to provide a satisfactory suspension system in which the load and reaction forces are disposed in spaced planes. Other objects will be apparent to those skilled in the art.

In the drawings:

FIG. 2 is a top plan view of that portion of the vehicle shown in FIG. 1.

FIG. 3 is a rear end elevation of the portion of the vehicle seen in FIGS. 1 and 2, with the rear frame cross member broken away and in section to show details.

FIG. 4 is a view in section substantially on line 4—4 of FIG. 2 but on a larger scale.

Figure 5A:
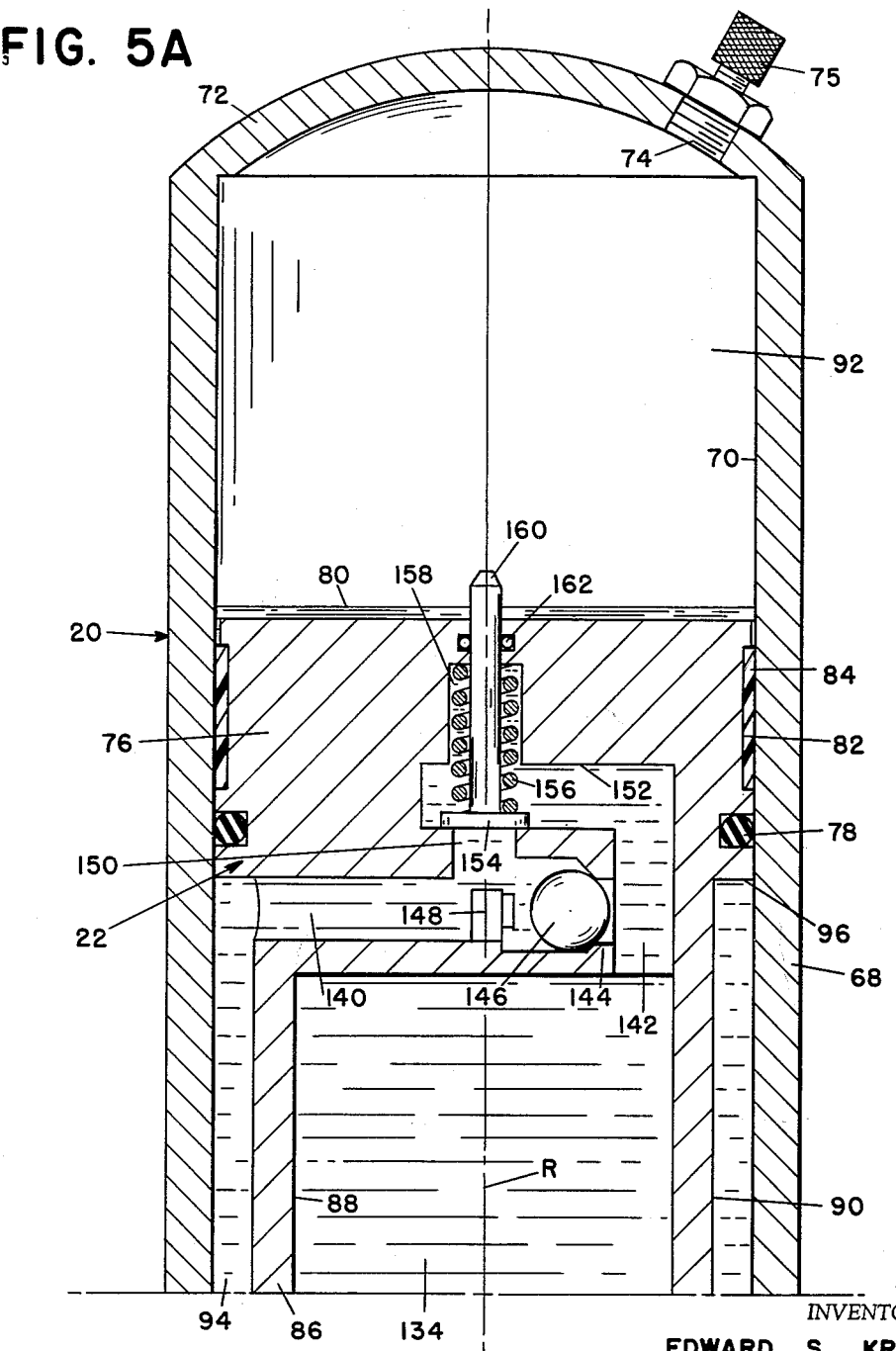
Figure 5B:
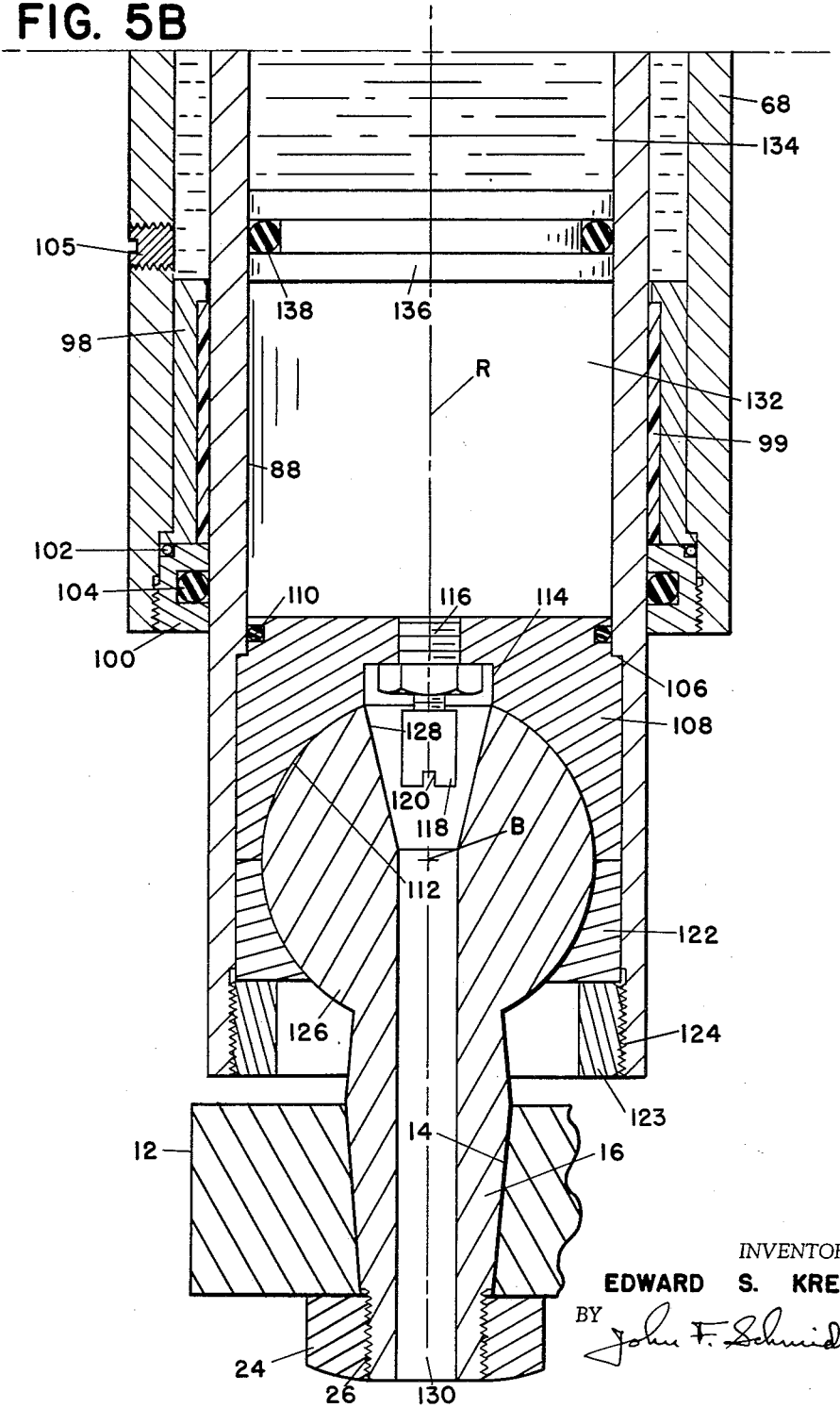
Figure 6:
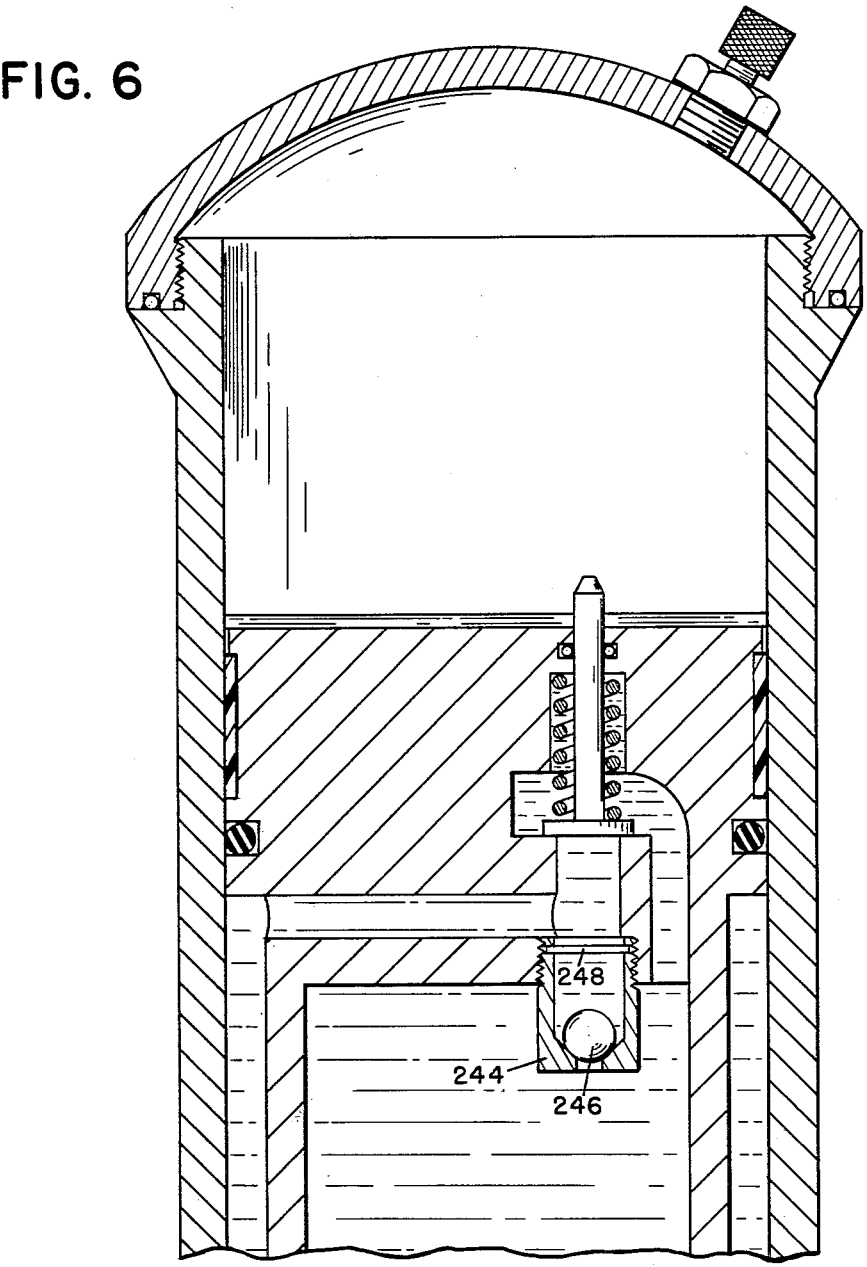

FIG. 5 is a longitudinal view in section through an oleopneumatic suspension device of this invention, being a section substantially through the reciprocation axis and being in two parts, FIG. 5A and FIG. 5B, in order to show details on a scale large enough to facilitate illustration and description of the invention; and FIG. 6 shows another embodiment of the integral shock control means shown in FIG. 5A.

The vehicle here shown in provided with a basic supporting structure of a conventional form, known as a frame. The term "basic supporting structure" is used as being more generic than the term "frame," because there are vehicles which are built on a "unit construction" basis, in which the body and frame are integral parts of a single structure, and there is no separately identifiable "frame" as such. An early example of such "unit construction" is the Nash passenger automobile of recent years.

Figure 1:
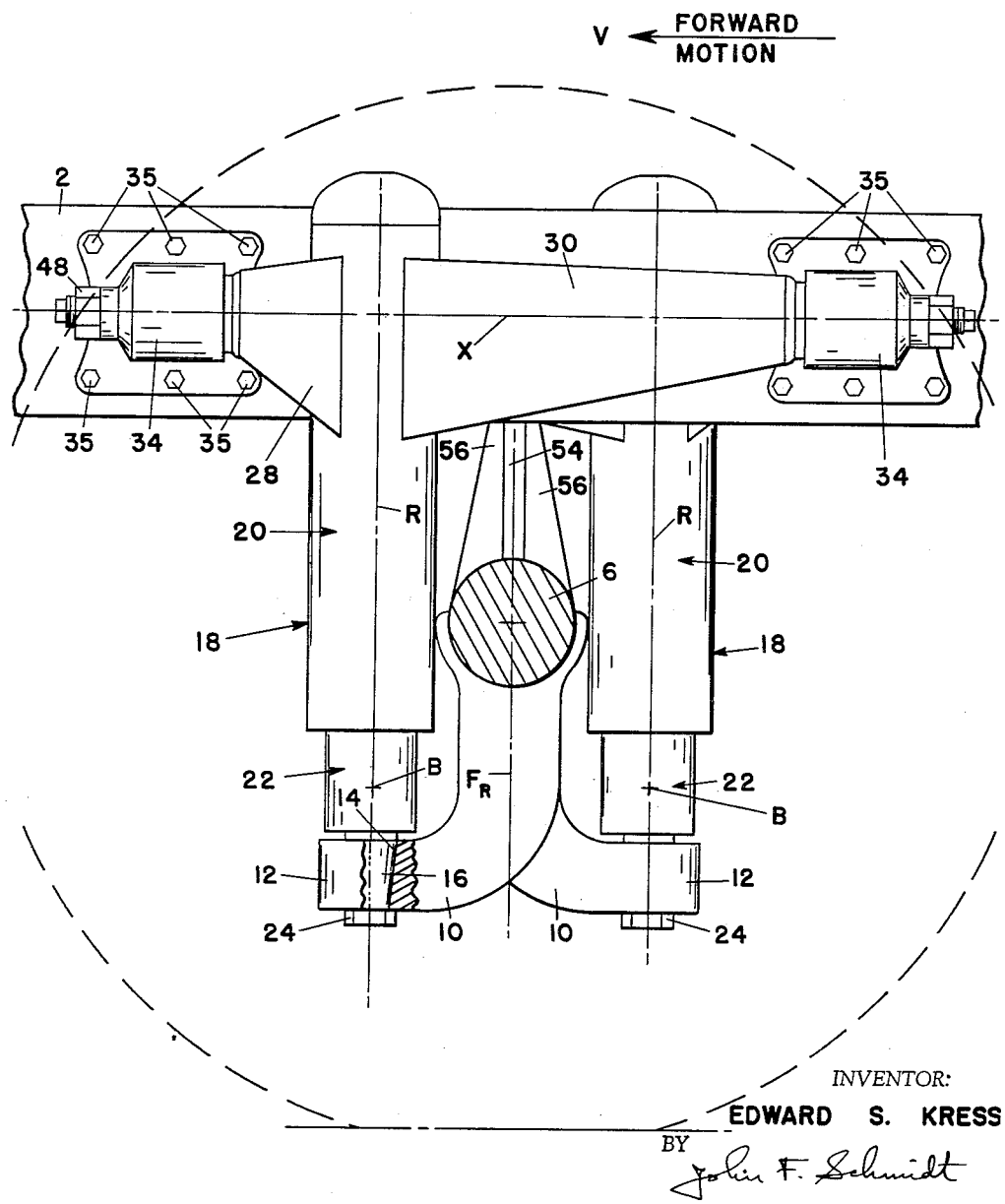
FIG. 1 is a view in section on line 1—1 of FIG. 2, and is largely a side elevation view of the rear axle portion of a vehicle, showing a suspension system embodying the invention.

The frame 2 here shown is provided with cross braces or members as needed to provided structural strength and rigidity. One such cross member is shown at 4. The vehicle is movable in a straight line direction (i.e., when not steering to the right or to the left) which is parallel to the center line of the vehicle. Thus, the arrows V in FIGS. 1 and 2 show the forward direction of such straight line movement.

An axle 6 is shown and will conventionally be disposed with its center line $\mathbb{C}_A$ (FIGS. 2 and 3) perpendicular to the normal direction of straight-line movement of the vehicle. Wheels 8 are rotatably mounted on the axle in a spaced-apart relationship—i.e., on opposite sides of the vehicle. Adjacent each wheel, a suspension anchor 10 is secured to the axle. Because of space limitations, the suspension devices cannot be mounted with their longitudinal axes passing through the axle center, and the anchors 10 carry offset ends 12, each of which is apertured as shown at 14 to receive the end 16 of a suspension device indicated generally at 18.

Suspension device 18 comprises a cylinder assembly 20 and a piston assembly 22. One assembly is secured to the basic supporting structure of the vehicle, and the other assembly is mounted to be carried by a wheel. Thus, in the embodiment shown here, cylinder assembly 20 is secured to frame 2 in a manner which will be detailed below, and piston assembly 22 is secured to its adjacent wheel by means of suspension anchor 10 and axle 6. For this purpose, the end 16 referred to above passes through the opening 14. A nut 24 engages threads 26 on end 16 to hold the several parts together.

Cylinder assembly 20 and piston assembly 22 have common or coincident longitudinal axes which for convenience may be called the reciprocation axis of the suspension device; the reciprocation axis is shown at R. As will be understood by those skilled in the art of expansible chamber devices of the piston-and-cylinder type, axis R is the axis along which the piston assembly reciprocates in the bore of the cylinder assembly.

The cylinder assembly 20 is mounted on the basic supporting structure in a manner to permit a necessary amount of swing in a plane perpendicular to vehicle motion V, in order to allow the axle to pivot about the roll center when the wheel on either side moves up or down in order to accommodate irregularities in the road. In order to prevent undesirable steering of the wheels because of deviations of axis $\mathbb{C}_A$ from a plane perpendicular to the direction of vehicle motion V, the structure of the suspension system should assure that such deviations cannot occur. To assure the desired limitations on movement of $\mathbb{C}_A$, each cylinder assembly is mounted on the supporting structure by means which permit the reciprocation axis R to move in such a way that, for any operating position of R, a plane may be passed through R which is perpendicular to vehicle motion V, and only in such a way.

In the embodiment shown, means are provided to pivot cylinder assembly 20 about an axis X which is fixed relative to the basic supporting structure (here the frame 2) and which lies in a plane perpendicular to $\mathbb{C}_A$. In the embodiment shown, the plane of axis X may also be defined as a plane parallel to vehicle motion V. With axis R lying in a plane perpendicular to axis X, cylinder assembly 20 moves (pivots) in a plane perpendicular to motion V and parallel to $\mathbb{C}_A$.

To accomplish the foregoing, mounting brackets 28 and 30 are secured to each cylinder assembly 20. The end of each mounting bracket remote from the cylinder assembly carries a trunnion or spindle like that shown at 32 in FIG. 4. Bearings or sockets 34 are fixed to frame 2 in any suitable manner, as by threaded members 35, to receive the spindles 32 and to provide, with the spindles, the pivot axes X. In a preferred form of the invention, spindles 32 are provided with bushings of a suitable bearing material, such as a Synthane plastic, shown at 36. The end of spindle 32 is engaged by a thrust plate 38 for a purpose indicated below.

Each socket 34 is provided with a suitable seal such as the O-ring 40. The end of each socket 34 remote from the cylinder assembly 20 is preferably of a reduced diameter as shown at 42 and is threaded to receive an adjusting screw 44, of which the inner end 46 is adapted to abut the plate 38. A square end 47 on screw 44 allows turning of the screw, and a lock nut 48 holds the screw 44 in any desired position.

Reference was made above to the fact that space limitations do not allow location of the suspension devices 18 in such a manner that the reaction force through the center of tire contact lies in the same plane as the reciprocation axis R. As is best seen in FIG. 1, the reaction force of the ground acting upward through the wheel lies in a plane indicated by line $F_R$. The axis R of the suspension device nearer to the observer is on the left. That portion of the weight of the vehicle which is sustained by the wheel above the plane of the section and thus not seen in FIG. 1, together with the reaction force, forms a couple which is determined in magnitude by, of course, the downward vector acting through the reciprocation axis R, the equal and opposite vector acting upward in the plane of line $F_R$ (FIG. 1), and the perpendicular distance between the vectors.

If the two suspension devices 18 seen in FIG. 1 are on the same side of the axle 6 (or if only one suspension device is used), the resulting couple must be opposed by an equal and opposite couple to keep the system in a state of stable equilibrium. Some of the advantages of this invention can be realized with such an arrangement, in which the equal and opposite couple is supplied by a pair of radius rods. One end of each radius rod 50 is pivotally secured to a suitable bracket 52 mounted on axle 6 by means of gussets 54 and 56 (FIGS. 1 and 3). As is perhaps best seen in FIG. 2, said one end pivots on a pin 58 which is secured to bracket 52 by threaded members 60. To give the pivot joints some radial flexibility, the portions of pins 58 in the rods engage rubber bushings, as will be understood by those skilled in the art.

A further point may be made here regarding the space limitations referred to above. It will be appreciated by those skilled in the art, especially by studying FIGS. 1 and 3, that the distance between the tire and the suspension device will not vary at the center B of the ball-and-socket connection shown in FIG. 5B and described in detail below, as the wheel rides up and down because of road irregularities. However, as the reference points on the tire and suspension device move upward from point B, the greater will be the changes in the distance between the tire and the adjacent suspension device. In order to fit the device 18 into the available space, these changes in spacing should be held to a minimum to prevent rubbing. Accordingly, the roll center of the system, here shown at $C_R$ in FIG. 3, is spaced above the axle approximately the same amount as the axes X—X, so that an arc struck from $C_R$ on both sides of a radius parallel to $\mathbb{C}_A$ and equal to the distance from $C_R$ to the tire, has little effect on the spacing between the tire and its adjacent device 18. Such an arc is shown at L in FIG. 3. It will of course also be appreciated that the distance from $C_R$ to a vertical plane through X remains constant.

The remaining end of each radius rod 50 is pivotally secured to the basic supporting structure—here the frame 2. Cross member 4 is broken away in FIG. 2 to show details of securing said remaining end of one of the rods, and it will be understood that the other rod is similarly mounted. Thus, a bracket 62 carries a pivot pin 64 by means of threaded member 66, pin 64 passing through a suitable bearing (rubber bushing) in the end of rod 50 in much the same manner as the forward end of the rod. In fact, the pins 58 and 64 are preferably identical and interchangeable, and of course threaded members 60 and 66 are likewise interchangeable.

In the preferred embodiment here shown, and as best seen in FIGS. 1 and 2, the two suspension devices 18 are disposed on opposite sides of the axle 6. In this arrangement, the couple which is a result of the distance between parallel planes passing through R of one device 18 and $\mathbb{C}_A$ is exactly offset or balanced by an equal and opposite couple involving the remaining device 18. In such a design, the radius rods provide lateral stability and provide restraining couples as needed to compensate for unequal tire loading and the like, as well as balancing couples due to braking and driving forces.

Reference will now be made to FIG. 5, here shown on two sheets of drawing and designated FIG. 5A and FIG. 5B, for a detailed description of the suspension device 18. Taking first the cylinder assembly 20, a cylindrical element 68 is shown provided with a bore 70 which can be referred to as the cylinder bore to distinguish it from the piston rod bore to be described later.

A head 72 may be bolted to the cylinder 68, it may be screwed on, or it may be welded to the cylinder 68; as here shown, cylinder 68 and head 72 are one piece. Head 72 forms a closure for the upper end of bore 70 and is apertured to receive a charging valve 74. A screw-on cap 75 protects and seals the exposed part of the valve. Valve 74 may be any suitable check valve arranged to permit fluid flow into the cylinder and manually releasable to permit fluid flow out of the cylinder.

The piston assembly 22 referred to above is reciprocable in bore 70 along a reciprocation axis R. In the embodiment shown in FIG. 5A, a cylindrical piston element 76 is grooved to receive an O-ring 78. An oil film 80 is carried at the top of the piston. A shallow groove 82 in the piston is provided to receive a bearing sleeve 84 which is preferably made of Synthane plastic.

A piston rod 86 having an internal bore 88 is secured to the piston in any suitable manner. As here shown, the rod and the piston are integral. The external surface 90 of the piston rod is spaced from cylinder bore 70. The space in the cylinder above the piston may be referred to as a head chamber 92, and another chamber 94 is formed by the annular space below the lower surface 96 and between the bore 70 and external surface 90 of the piston rod 86. The annular chamber 94 is closed at its lower end by a lower end closure forming part of the cylinder assembly, the end closure comprising a sleeve 98, a Synthane plastic bearing sleeve 99, and a threaded ring 100 suitably packed as shown at 102 and 104. Charging access to chamber 94 is provided by a plug 105.

Reference was made to piston rod bore 88. Bore 88 is closed at its upper end by piston element 76 and valves to be described below, and at its lower end by a rod closure. As can be seen in FIG. 5B, the lower end of bore 88 is stepped to form a shoulder 106. A rod closure 108 is similarly shaped to fit the stepped bore and is suitably packed as shown at 110. Rod closure 108 is spherically recessed at 112, and the spherical surface is further recessed by a counterbore 114 which is centrally apertured to receive a charging check valve 116 similar to valve 74 in the cylinder head. A cap 118 protects the valve and provides a seal, the cap being slotted at 120 for application and removal by means of a screw driver.

Closure 108 forms half of the socket of a universal movement type of joint, here shown as a ball-and-socket joint having a center B, used to connect the piston assembly with the axle by way of anchor 10. Thus, the other half of the socket is an annulus 122 which is held in place by a nut 123; nut 123 engages cooperating threads in the rod end as shown at 124. The socket formed by the two parts 108 and 122 receives a ball 126 which carries the end 16 referred to above and threaded at 26 to receive nut 24 (FIG. 1).

The cap end of charging valve 116 extends into the spherical cavity of closure 108, and ball 126 is provided with a bore 128 to receive the protruding valve and its cap, recess 128 being large enough to permit the necessary angular movement of the end 16 relative to reciprocation axis R. The stem or end 16 and part of ball 126 are provided with a bore 130 which is coaxial and connects with recess 128 to permit the use of a tool such as a screw drive to remove and apply cap 118.

The closure in the lower end of rod bore 88 effectively seals said lower end against fluid leaks. The space in the rod bore is divided into a first rod chamber 132 and a second rod chamber 134 by a membrane 136 which is movable to vary the volume of the rod chambers. As here shown, the membrane is a piston reciprocable in rod bore 88, being packed as shown at 138 to seal the two rod chambers from each other.

Mention was made above of the need, or at least desirability, of shock control characteristics in suspension devices, and of the fact that shock control in conventional devices is accomplished by apparatus added to the suspension devices, whereas in devices of the type here disclosed and claimed, such control can be accomplished by means formed integral with the suspension device.

The annular chamber 94 and the two rod chambers 132 and 134 cooperate to provide the shock control referred to. Thus, first fluid conduit means are provided to connect the annular chamber with the second rod chamber, with an unbiased check valve arranged to permit fluid to flow only from the second rod chamber to the annular chamber. In the embodiment shown in FIG. 5A, a transverse passage 140 in piston element 76 connects at one end with the upper part of annular chamber 94, and at its other end with an axial passage 142 in element 76. A valve seat-providing element 144 carries a ball 146 adapted to engage the seat of element 144 to prevent fluid flow from the annular chamber to the second rod chamber. A stop 148 limits the movement of ball 146 in the passage-open direction.

Second fluid conduit means are provided connecting the second rod chamber and the annular chamber, and a check valve in the second fluid conduit means is biased against flow from the annular chamber to the second rod chamber and seats to prevent flow in the opposite direction. In FIG. 5A, an axial passage 150 in element 76 connects at its lower end with passage 140 and at its upper end with a transverse passage 152, the latter connecting also with axial passage 142. At the intersection of passages 150 and 152, a valve seat is provided to cooperate with a check valve element 154 to seal the second fluid conduit means against flow from the second rod chamber to the annular chamber. Flow in the opposite direction is opposed by the bias of a spring 156 which bears at its lower end against the upper surface of element 154 and at its upper end against the end of a counterbore 158.

A stem 160 is secured to the upper surface of element 154 and extends through an opening in piston element 76 into the head chamber 92. The stem is suitably packed as at 162 to seal the opening against leakage.

Reference was made above to an unbiased check valve. The object of such a check value is a minimum resistance to fluid flow in the permitted direction. Even though a light spring may be used in some cases to insure seating of the ball, the spring force is so slight by comparison with the force of fluid against the spring that, for all practical purposes, the ball may be described as unbiased.

Another embodiment of the shock control means is shown in FIG. 6, wherein the valve seat-providing element 244 is arranged with its axis vertical instead of horizontal. Ball 246 thus moves upward to open the passage to fluid flow. Even though, in this embodiment, the weight of the ball serves to bias the ball into the valve-closed position, that weight is small compared with the fluid pressure upward which unseats the ball. A pin 248 assures that ball 246 will always be in position to engage its seat.

*Operation*

The several chambers are charged to the necessary pressures according to the loads to be carried. What these pressures should be will be computed in each case and need not be set forth here. It will suffice here to state that head chamber 92 and first rod chamber 132 are charged with a relatively inert, dry gas such as nitrogen which is of course a compressible fluid. Annular chamber 94 and second rod chamber 134 are charged with a dry incompressible fluid such as oil.

If a line is drawn connecting the pivot axes X—X in FIG. 3, whether that line passes through $C_R$, just above it, or just below it, with the system stationary and in equilibrium, will depend on a number of variables, including the pressure in the several chambers and the load. However, it will be understood by those skilled in the art that $C_R$, the roll center, is desirably close to a plane (showing as a line in FIG. 3) through the pivot axes on both sides of the vehicle in order that vertical movement of the wheels due to road irregularities may effect tire clearance a minimum and thus allow maximum utilization of the available space.

If only a single suspension device is used, or if two devices are used on both sides of the axle, the distance between axis R and a plane represented by line $F_R$, FIG. 1, causes the load and the reaction forces to form a couple which must of course be opposed by an equal and opposite couple. The opposing couple is furnished by the radius rods 50.

In the embodiment here shown, the couple created at one side is offset by an equal and opposite couple at the other side because the devices 18 are disposed on opposite sides of the axle. Even though the radius rods in the embodiment shown do not have to hold the system in equilibrium as in the case in which both devices 18 are on one side of the axle, nevertheless the radius rods stabilize the system to the extent of providing the center about which the wheels move vertically relative to the rest of the chassis.

As an example, let it be assumed that the right wheel as seen in FIG. 3 strikes an elevation, or "bump," in the road. Because the suspension device is yieldable, the initial impact shock results in the wheel moving upward relative to the frame and the cylinder assembly. Because the wheel axle is connected to the rest of the chassis through the radius rods 50, the relationship of the wheel, as it moves upward, to the adjacent cylinder assembly is determined by the roll center $C_R$ as established by the radius rods. Moreover, it will be noted that $C_R$ is slightly below a line connecting the pivot axes X—X of the two devices 18 as the parts appear in FIG. 3.

As the wheel referred to rises due to the obstruction in the road, such movement raises $C_R$ and moves it closer to, and sometimes through, a plane through the two pivot axes X—X, so that the resulting movement of the wheel relative to the adjacent cylinder has a minimum effect on the space between the wheel and the cyinder. As for the lower end of device 18, since the point B of end 16 is fixed relative to the inner surface of the wheel, the lower end of the suspension device tends to move laterally with the wheel.

If the wheel referred to drops into a hole, the foregoing discussion still applies except that, with the parts as shown in FIG. 3, $C_R$ tends to fall further below the plane through axes X—X and to the extent, lateral movement of the wheel relative to its adjacent cylinder tends to be greater than when the wheel strikes a bump. However, because $C_R$ starts from a position close to the aforesaid plane, the relative lateral movement between wheel and cylinder is still small enough to avoid rubbing.

Referring now to FIG. 5 (FIGS. 5A and 5B), it will be seen that end 12 of anchor 10 firmly grips end 16 of the piston assembly, so that the universal movement connection (FIG. 5B) gives anchor 12 the freedom required to permit anchor 12 and the axis of end 16 to change their angular orientation relative to reciprocation axis R as the adjacent wheel moves up and down due to road irregularities. It may be pointed out here that, as the wheel moves as aforesaid, the geometry of the entire system is such that a plane defined by the inner face of the wheel remains substantially parallel to axis R of the adjacent device 18.

For a discussion of what happens in the fluid chambers, reference again will be made to FIG. 5. The load (payload plus tare) is supported by the fluid under pressure in head chamber 92. It should be noted that the pressure in annular chamber 94 opposes the pressure in chamber 92. It will moreover be noted that the pressure in the rod chambers will normally not be greater than the pressure in annular chamber 94 because of unbiased check valve 144–146, although the rod chamber pressure can be and sometimes is less than the pressure in annular chamber 94. It will be observed that the pressure in rod chambers 132 and 134 will be substantially equal because membrane 136 is readily movable in response to pressure differences, and because the weight and inertia of membrane 136 and the static head in chamber 134 are usually negligible in view of the comparatively high fluid pressure to which the chambers are charged.

Let it be supposed now that the vehicle wheel associated with the device of FIG. 5 strikes a bump. The relatively large inertia of the load will cause piston assembly 22 to move upward in the bore 70, compressing the elastic fluid in the head chamber 92. Such upward movement of the piston effects an increase in volume of annular chamber 94, occupied by an incompressible and quite inelastic fluid. The pressure throughout the annular chamber and in transverse passage 140 drops, whereupon the (then) greater pressure in rod chambers 132 and 134 causes oil to move through check valve 144–146 to keep the annular chamber full of oil. Membrane 136 moves upward under the influence of the compressible fluid in chamber 132.

If the bump is short in the direction of motion, the parts will not have time to re-establish equilibrium conditions. As the wheel rides off the bump, the piston assembly tries to move down in cylinder bore 70 under the influence of the pressure in head chamber 92. Such movement can only be accomplished by decreasing the volume in annular chamber 94. However, since the fluid in chamber 94 is incompressible, the piston assembly cannot move down without displacing some of the fluid from chamber 94.

Ball 146 is now held securely against its seat, so oil cannot flow into chamber 134 through the unbiased check valve. If there is to be any flow of oil, it must be through passage 150, and element 154 must be unseated to permit such flow. Element 154 is held seated by the force exerted by preloaded spring 156, by the pressure in rod chamber 134 acting on the upper surface of element 154, and by the pressure in head chamber 92 acting on stem 160. The force to unseat element 154 comes from the pressure in annular chamber 94, and that force is of course the product of that pressure and the area of element 154 which is exposed to the pressure.

It must be remembered that the pressure in head chamber 92 is quite high because of the upward movement of the piston due to the bump, as just described. There is accordingly an extra "push" being exerted on the upper surface of the piston, and this extra force causes the pressure in annular chamber 94 to build up rapidly to a value sufficient to overcome the forces which are trying to hold element 154 seated. Accordingly, the pressure under element 154 rapidly increases to a value sufficient to unseat the valve element.

At this point in the discussion, it is well to review what was said earlier regarding inherent shock control. Suspension devices of the type which rely on the elastic deformation of metal are faced with a problem called "bottoming" or "hitting bottom," wherein, because of the practically constant spring rate, the frame or a portion of the body deflects a maximum and strikes a portion of the unsprung wheel mounting means or even the wheel itself, as for example where the underside of a fender comes down onto the tire. At the other extreme, the vehicle may bounce up so far that the wheel leaves the road. Various measures are employed to overcome these difficulties, such as "helper" springs, shock absorbers which are auxiliaries to the metal springs, and the like. In the end, all or nearly all suspensions of that type for heavy trucks are forced to rely on springs which are so stiff that they cannot "bottom;" such springs, however, are so stiff that they deflect very little and consequently give a very jouncy or rough ride, and hence the expression "rides like a truck."

Suspensions of the type here disclosed and claimed are equipped with inherent shock control devices. Thus, where impact moves the piston upward in the cylinder bore, the shock of impact is absorbed by compression of the gas in chamber 92. Moreover, the shock of bottoming is avoided by the nature of compressed gas. Because $P_1V_1=P_2V_2$, as the piston approaches the upper end of the cylinder bore and the volume becomes very small, the pressure increases greatly and with it, the resistance to further upward movement.

As the wheel moves off the bump, oil is moved out of annular chamber 94 into rod chamber 134, compressing the gas in rod chamber 132 and cushioning the rebound shock.

Reference will now be made to still another phenomenon of spring suspension requiring shock control. Let a soft coil spring be hung from a hook and a weight be hung on the spring; assume that the weight is light enough to avoid stretching the spring beyond its elastic limit, but is heavy enough to effect appreciable elastic deformation. If the system is in equilibrium, it can be caused to vibrate either by pushing up on the weight or by pushing down on it. The system will again come to rest if let alone, the amplitude of the vibrations diminishing gradually. The system can be brought to rest also by connecting a vibration damper or "shock absorber" to it. If the undamped system with its vibating weight be looked upon as an elastic ball dropped from a considerable height onto a hard floor, the weight can be described as "bouncing." Its first cycle of such motion is the first "bounce," and thereafter the weight "rebounds" a number of times. The number of "rebounds" can be brought under close control by attaching a damping device to the system, in which case the damping device becomes a rebound control means. As used in the claims in this case, the term "rebound control" has the meaning described above in the example of the vibrating weight.

Let the simple weight-and-spring system referred to above now be subjected to a continuing disturbing influence, as opposed to a single or isolated "push" on the weight. If the continuing disturbance constitutes a succession of equally spaced (in time) impulses, it will be understood that such impulses could be applied to the system at a frequency in tune with the resonant or natural frequency of the system, in which case the amplitude of the vibrations would quickly increase to several times the amplitude resulting from a single and isolated push on the weight.

Vehicle wheel suspension devices function very much like the foregoing example. A vehicle moving along a good paved highway encounters an object lying in the path of one of the wheels. The wheel strikes the object and runs over it, even as a single isolated push is applied to the suspended weight of the example. As in the example, the vehicle and its load bounce on the spring of the wheel in question, then rebound, over and over again unless a damper, or rebound control device, is applied to the wheel suspension system.

Let is now be assumed that, instead of a good paved road, the vehicle negotiates a section of "improved country road" and encounters a stretch of "washboard" road, where more or less equally spaced depressions apply a rapid succession of blows to the wheel. In most cases, within the normal operating speed limits of the vehicle, there will be one or more speeds which, for the given spacing of depressions, will cause vibration of the wheel at the natural frequency of the spring system. Such operation at resonant frequency could quickly cause the wheel suspension to reach one end or the other of its stroke, with the resultant shock to the load (and operator), and damage to the equipment. Although one such incident is not likely to hurt the operator or damage the load or the vehicle, it must be remembered that such incidents are multiplied by time and distance, resulting in undue operator fatigue and over-frequent breakdowns in equipment.

Turning again to the structure here shown in FIG. 5A, there is virtually no damping effect on the piston upstroke. However, as the piston attempts to "bounce back" or rebound, free elastic movement is prevented by the element 154 which is responsive to three fluid pressures as aforesaid. Thus, the rebound is effectively controlled on the very first stroke.

I have found that it is desirable to keep the rebound control, or damping, force a nearly constant percentage of the load. This point is probably best illustrated by some figures. In practice, I have found a relationship between the damping force and the load on the suspension device for optimum ride characteristics, and this damping force is a function of the pressure in annular chamber 94 and the pressure in rod chamber 134. Thus if we define the damping pressure, $P_D$, as the difference between the pressures in chambers 94 and 134, we get a formula (1) $\qquad P_D = P_A - P_2$ where $P_D$ is the damping pressure
$P_A$ is the pressure in chamber 94 and $P_2$ is the pressure in chamber 134.

Next, I define the damping force as (2) $\qquad F_D = P_D \times A_A$ where the new quantity, $A_A$, is the cross-sectional area of chamber 94 (or the area of surface 95). Thus the damping force, $F_D$, is a force which applies to the under side, area 96, of the piston and restrains the "bounce" or rebound. Now let $P_H$ = the pressure in chamber 92
$A_V$ = the area of the underside of element 154 exposed and responsive to $P_A$
$A_R$ = the area of rod or stem 160 and $F_S$ = the force of spring 156.

The force applied to the underside of element 154 is $P_A \times A_V$. Before element 154 can be unseated, all forces acting on its lower surface must be greater than all the forces acting on its upper surface. Thus, the limiting conditions can be defined as (3) $\qquad P_A \times A_V = F_S + P_H \times A_R + P_2 \times (A_V - A_R)$ From Equation 1 above, $P_A = P_D + P_2$, whence (4) $\qquad (P_D + P_2) \times A_V = F_S + P_H \times A_R + P_2 \times (A_V - A_R)$ Simplifying, Equation 4 becomes (5) $\qquad P_D \times A_V = F_S + (P_H - P_2) \times A_R$ Now let it be assumed that the vehicle is loaded in such a way that each suspension device supports 10,000 pounds. If the device is charged to 200 p.s.i. in chamber 94 and 600 p.s.i. in chamber 92, $A_A = 3.5$ square inches, $A_R = .05$ square inch, $A_V = .10$ square inch, and $F_S = 37$ pounds, then a force of 700 pounds pushes up on the piston and 10,700 pounds pushes down on the piston. With the system in equilibrium, $P_2$ is the same as $P_A$, or 200 p.s.i. Solving (5) above, for $P_D$, we get 570 p.s.i. From Equation 2, $F_D = 1995$ pounds, or close to 20 percent of the load. Also, from the above relationships, it turns out that there is a net force of 77−10, or 67 pounds holding element 154 seated.

Unloaded, each device 18 supports 3,000 pounds, with $P_H$ and $P_A$ being 300 and 700 p.s.i. respectively, a force of 2,450 pounds pushes up on the piston and a force of 5,450 pounds pushes down. According to these values, $P_D$ comes to 170 p.s.i., and $F_D$ is 595 pounds, or, again, close to 20 percent of the load. In this case, there are 70 pounds pushing up on element 154, and 87 pounds pushing down, or a net of 17 pounds holding element 154 seated.

It will be noted from the above that there is a net force of 67 pounds holding element 154 seated when the vehicle is loaded, and a net of 17 pounds, vehicle unloaded. These values are within allowable limits. Moreover, it is desirable to have a greater force present when the vehicle is loaded, because at that time there is a greater "push" available above the piston to move the piston downward to unseat element 154. To show the advantages of the rebound control system of this invention, assume a system in which stem 160 is not exposed to $P_H$, but instead terminates in the counterbore so as to be exposed to $P_2$. In that case, under equilibrium conditions, the force holding the valve seated is the force of the spring, and is a constant, regardless of load. However, it must be remembered that the equilibrium conditions referred to hardly ever exist when the vehicle is in motion. Suppose that, with the structure shown, a wheel has just hit a severe bump so that $P_H$ is very high and $P_2$ has been reduced as the piston starts back down. Under the assumed dimensions, Equation 5 becomes (6) $\qquad P_D \times A_V = F_S + .05(P_H - P_2)$ which means that the spring gets a very substantial assist from $P_H$ acting through stem 160, and this is desirable to dampen the motion. If stem 160 did not project up through the piston, and instead were exposed only to $P_2$, element 154 would unseat too quickly and would not dampen the motion adequately. However, if spring 156 were made strong enough to provide adequate damping under those conditions, the force holding element 154 seated would be too high to keep the tire on the ground with piston 76 near the lower end of its travel. This same difficulty would exist when the vehicle ran empty.

As an example of the "severe bump" just referred to, suppose that a 2 g. load has been thus imposed on device 18 so that $P_H=1200$ p.s.i. and $P_2=150$ p.s.i. Using (2) and (5) above, $P_D$ comes to 895 p.s.i. and $F_D$ to 3,130 pounds instead of 2,000 pounds. This extra 1,130 pounds of dampening force is a "bonus" and results in improved ride characteristics.

From the foregoing, the importance of proper alignment of devices 18 relative to the axle will be appreciated. Small adjustments in such alignment can be made by means of screws 44 in the two bearings 34 of a device 18. Thus, in FIG. 2, if axis $\mathcal{C}_A$ is not quite perpendicular to V, the condition can be corrected by means of screws 44.

From the examples given, those skilled in the art can visualize and fully understand other examples, from which it is evident that this invention provides a greatly improved suspension system having improved rebound control and ride characteristics.

It will be understood that the embodiments of the invention here shown are only illustrative and the other embodiments can be devised within the scope of the appended claims.

What is claimed is:

1. In a vehicle having a basic supporting structure, an axle, a pair of laterally spaced wheels on the axle, an oleopneumatic suspension device for each wheel, each device comprising a cylinder assembly and a piston assembly and having a reciprocation axis, means securing one assembly of each device to said structure with said axis spaced from the axle by a given distance, the devices being disposed on opposite sides of the axle, and means securing the other assembly to the axle.

2. A vehicle as in claim 1, in which the two devices are disposced on opposite sides of the axle with their axes equidistant from the axle.

3. A vehicle having a normal direction of straight-line movement and a basic supporting structure, an axle disposed at right angles to said direction, a pair of laterally spaced wheels on the axle, an oleopneumatic suspension device for each wheel, each device comprising a cylinder assembly and a piston assembly and having a reciprocation axis, means mounting one assembly of each device to pivot about an axis fixed on said structure and lying in a plane perpendicular to the axle, the reciprocation axis being spaced from the axle by a given distance, the devices being disposed on opposite sides of the axle, and means connecting the remaining assembly of each device to the axle.

4. A vehicle as in claim 3, in which the two devices are disposed on opposite sides of the axle with their axes equidistant from the axle.

5. A vehicle as in claim 3, in which said one assembly is carried by the mounting means with the reciprocation axis lying in a plane perpendicular to said pivot axis.

6. A vehicle as in claim 3, in which the two devices are disposed on opposite sides of the axle with their reciprocation axes equidistant from the axle, each reciprocation axis lying always in a plane parallel to the axle.

7. A vehicle having a normal direction of straight-line movement and a basic supporting structure, an axle, a pair of laterally spaced wheels on the axle, an oleopneumatic suspension device for each wheel, each device comprising a cylinder assembly and a piston assembly, means securing the assemblies of one device to said structure and the axle to provide a couple effective in a plane parallel to said direction, said couple having a moment axis perpendicular to said plane and to said direction of straight-line movement, and means securing the assemblies of the other device to said structure and the axle to provide another couple effective in a second plane parallel to said direction, said couple having a moment axis perpendicular to said second plane and to said direction of said straight-line movement, the two couples opposing each other.

8. A vehicle having a basic supporting structure, an axle, a pair of laterally spaced wheels on the axle, an oleopneumatic suspension device for each wheel comprising a cylinder assembly and a piston assembly, means securing the assemblies of one device to said structure and the axle to provide a couple effective in a first plane, said couple having a moment axis perpendicular to said first plane, and means securing the assemblies of the other device to said structure and the axle to provide an equal and opposite couple effective in a second plane, said second couple having a moment axis perpendicular to said second plane.

9. A vehicle having a basic supporting structure, an axle, a pair of laterally spaced wheels on the axle, an oleopneumatic suspension device for each wheel comprising a cylinder assembly and a piston assembly, means pivotally mounting one assembly of each device on said structure, the devices being disposed on opposite sides of the axle, and universal movement means connecting the other assembly of each device with the axle.

10. A vehicle having a basic supporting structure, an axle, a pair of laterally spaced wheels on the axle, an oleopneumatic suspension device for each wheel comprising a cylinder assembly and a piston assembly, means pivotally mounting one assembly of each device on said structure, and universal movement means connecting the other assembly of each device with the axle, the mounting and connecting means for one device forming a couple tending to turn the supporting structure about the axle and the mounting and connecting means for the other device forming an equal and opposite couple.

11. A vehicle having a basic supporting structure, an axle, laterally spaced wheels on the axle, an oleopneumatic suspension device for each wheel, each device comprising a cylinder assembly and a piston assembly and having a reciprocation axis, means mounting one assembly of each device to pivot about an axis fixed on said structure and lying in a plane perpendicular to the axle, the reciprocation axis being spaced from the axle by a given distance, means pivotally securing the axle to the basic supporting structure about a roll axis and including means to permit vertical movement of the roll axis.

12. A vehicle having a basic supporting structure, an axle, laterally spaced wheels on the axle, a suspension device for each wheel having a reciprocation axis and being elastically extensible along said axis, means mounting each device to pivot about an axis fixed on said structure and lying in a plane perpendicular to the axle, means pivotally securing the axle to the basic supporting structure and including a vertically movable roll axis, and universal movement means connecting each device to the axle.

13. A vehicle having a basic supporting structure, an axle, laterally spaced wheels on the axis, a suspension device for each wheel having a reciprocation axis and being elastically extensible along said axis, means mounting each device to pivot about an axls fixed on said structure and lying in a plane perpendicular to the axle, means pivotally securing the axle to the basic supporting structure and including a vertically movable roll axis, and means connecting each device to the axle.

14. A vehicle having a normal direction of straight line movement and a basic supporting structure, an axle, laterally spaced wheels on the axle, a suspension device for each wheel having a reciprocation axis and being elastically extensible along said axls, means mounting each device to pivot about an axis fixed on said structure and parallel to said direction of movement whereby the reciprocation axis is swingable in a plane parallel to the axle, means pivotally securing the axle to said structure and including a roll axis vertically movable above and below a plane passing through the mounting axes of said devices, and means connecting each device to the axle.

15. A vehicle having a normal direction of straight-line movement and a basic supporting structure, an axle, laterally spaced wheels on the axle, a suspension device for each wheel having a reciprocation axis and being elastically extensible along asid axis, means mounting each device to pivot about an axis fixed on said structure and parallel to said direction of movement whereby the reciprocation axis is swingable in a plane parallel to the axle, means pivotally securing the axle to said structure and including a vertically movable roll axis, means connecting each device to the axle, and means associated with the device mounting means to change the angular orientation of the axle relative to said direction of movement.

16. A vehicle as in claim 15, in which the orientation changing means includes a plurality of threaded members connected to shift the plane of swing of the reciprocation axis.

17. A vehicle having a normal direction of straight-line movement and a basic supporting structure, an axle, laterally spaced wheels on the axle, a suspension device for each wheel having a reciprocation axis and being elastically extensible along said axis, means mounting each device to pivot about an axis fixed on said structure and parallel to said direction of movement whereby the reciprocation axis is swingable in a plane parallel to the axle, means pivotally securing the axle to said structure and including a pair of radius rods having spaced apart ends connected to said supporting structure and closely adjacent ends supporting a roll axis to which the axle is connected, and means connecting each device to the axle.

18. A vehicle having a normal direction of straight-line movement and a basic supporting structure, an axle, laterally spaced wheels on the axle, a suspension device for each wheel having a reciprocation axis and being elastically extensible along said axis, means mounting each device to pivot about an axis fixed on said structure and parallel to said direction of movement whereby the reciprocation axis is swingable in a plane parallel to the axle, means pivotally securing the axle to said structure and including a pair of radius rods having spaced apart ends connected to said supporting structure and closely adjacent ends supporting a roll axis to which the axle is connected, and means connecting each device to the axle with the reciprocation axes spaced from the axle.

19. A vehicle having a normal direction of straight line movement and a basic supporting structure, an axle, laterally spaced wheels on the axle, a suspension device for each wheel having a reciprocation axis and being elastically extensible along said axis, means mounting each device to pivot about an axis fixed on said structure and parallel to said direction of movement whereby the reciprocation axis is swingable in a plane parallel to the axle, means connecting each device to the axle with the reciprocation axes spaced from the axle, the devices being disposed on opposite sides of the axle, and means pivotally securing the axle to said structure.

20. A vehicle having a normal direction of straight line movement and a basic supporting structure, an axle, laterally spaced wheels on the axle, a suspension device for each wheel having a reciprocation axis and being elastically extensible along said axis, means mounting each device to pivot about an axis fixed on said structure and parallel to said direction of movement whereby the reciprocation axis is swingable in a plane parallel to the axle, means connecting each device to the axle with the reciprocation axes spaced from the axle, and means pivotally securing the axle to said structure and including a vertically movable roll axis.

21. A vehicle having a normal direction of straight line movement and a basic supporting structure, an axle, laterally spaced wheels on the axle, a suspension device for each wheel having a reciprocation axis and being elastically extensible along said axis, means mounting each device to pivot about an axis fixed on said structure and parallel to said direction of movement whereby the reciprocation axis is swingable in a plane parallel to the axle, means connecting each device to the axle with the reciprocation axes spaced from the axle, and means pivotally securing the axle to said structure and including a roll axis vertically movable above and below a plane passing through the mounting axes of said devices.

22. A vehicle having a basic supporting structure, an axle, laterally spaced wheels on the axle, an oleopneumatic suspension device for each wheel, each device comprising a cylinder assembly and a piston assembly and having a reciprocation axis, means mounting one assembly of each device to pivot about an axis fixed on said structure and lying in a plane perpendicular to the axle, the reciprocation axis being spaced from the axle by a given distance, means pivotally securing the axle to the basic supporting structure about a roll axis, the devices being disposed on opposite sides of the axle, and means connecting the remaining assembly of each device to the axle.

References Cited in the file of this patent

UNITED STATES PATENTS

| | | |
|---|---|---|
| 891,328 | Cowles | June 23, 1908 |
| 2,914,337 | Kress | Nov. 24, 1959 |
| 2,971,772 | Tantlinger | Feb. 14, 1961 |
| 2,977,111 | Tuczek | Mar. 28, 1961 |
| 2,982,538 | Carbon | May 2, 1961 |
| 2,998,264 | Stump | Aug. 29, 1961 |
| 3,083,027 | Lindblom | Mar. 26, 1963 |

FOREIGN PATENTS

| | | |
|---|---|---|
| 964,928 | Germany | May 29, 1957 |